US006862566B2

(12) United States Patent
Wakita et al.

(10) Patent No.: US 6,862,566 B2
(45) Date of Patent: Mar. 1, 2005

(54) METHOD AND APPARATUS FOR CONVERTING AN EXPRESSION USING KEY WORDS

(75) Inventors: Yumi Wakita, Nara (JP); Kenji Matsui, Ikoma (JP)

(73) Assignee: Matushita Electric Industrial Co., Ltd., Osaka (JP)

( * ) Notice: Subject to any disclaimer, the term of this patent is extended or adjusted under 35 U.S.C. 154(b) by 358 days.

(21) Appl. No.: 09/803,779

(22) Filed: Mar. 12, 2001

(65) Prior Publication Data

US 2002/0010573 A1 Jan. 24, 2002

(30) Foreign Application Priority Data

Mar. 10, 2000 (JP) ....................................... 2000-066494

(51) Int. Cl.[7] ................................................ G06F 17/20
(52) U.S. Cl. ................................................ 704/2; 704/4
(58) Field of Search .......................... 704/8, 10, 4, 277, 704/257, 2, 5, 7; 707/2, 3, 4, 5, 6

(56) References Cited

U.S. PATENT DOCUMENTS 5,369,577 A * 11/1994 Kadashevich et al. ......... 704/9
5,375,235 A * 12/1994 Berry et al. ................... 707/5
5,384,701 A * 1/1995 Stentiford et al. .......... 704/277
5,708,829 A * 1/1998 Kadashevich et al. ...... 715/531
5,765,131 A * 6/1998 Stentiford et al. .......... 704/277
5,848,389 A * 12/1998 Asano et al. ............... 704/239
5,956,668 A * 9/1999 Alshawi et al. ................ 704/2
5,956,711 A * 9/1999 Sullivan et al. ................ 707/6
5,991,711 A * 11/1999 Seno et al. .................... 704/3
5,995,919 A * 11/1999 Chang et al. .................. 704/8
6,026,407 A * 2/2000 Hanada et al. .............. 707/102
6,041,293 A * 3/2000 Shibata et al. ................. 704/4
6,128,613 A * 10/2000 Wong et al. ................... 707/7
6,185,550 B1 * 2/2001 Snow et al. ................... 707/1
6,192,332 B1 * 2/2001 Golding ......................... 704/2
6,266,642 B1 * 7/2001 Franz et al. ................ 704/277
6,321,188 B1 * 11/2001 Hayashi et al. ................ 704/4
6,321,189 B1 * 11/2001 Masuichi et al. .............. 704/7
6,356,865 B1 * 3/2002 Franz et al. ................... 704/2
6,571,240 B1 * 5/2003 Ho et al. ........................ 707/5

FOREIGN PATENT DOCUMENTS

| | | |
|---|---|---|
| JP | 8-278974 | 10/1996 |
| JP | 2848458 | 11/1998 |
| JP | 2000-200275 | 7/2000 |
| WO | WO 88/02516 | 4/1988 |

OTHER PUBLICATIONS

N. Hataoka, et al. "Development of Robust Speech Recognition Middleware on Microprocessor", Central Research Labratory, Hitachi Ltd. (Sep. 5, 1999).

* cited by examiner

*Primary Examiner*—Richemond Dorvil
*Assistant Examiner*—Martin Lerner
(74) *Attorney, Agent, or Firm*—RatnerPrestia

(57) ABSTRACT

An expression converting method wherein for each sentence in a corpus, key words are selected from the sentence, a combination of key words that are in a co-occurrence relation is identified from among a predetermined number of combinations of key words among the selected key words, and the identified key word combination and an expression into which the sentence from which the key words are selected is converted are previously associated, and wherein predetermined key words are selected from an input sentence, the selected key words are combined, the key word combinations and the previously identified key word combination of each sentence are compared, one or more than one sentences that coincide or have a high degree of similarity as a result of the comparison are selected, and expressions into which the selected sentences are converted are output.

8 Claims, 16 Drawing Sheets

Fig. 2 (a)

Example of bilingual key word dictionary

| | |
|---|---|
| kohi [コーヒー] | : coffee |
| onegai [お願い] | : * |
| miruku [ミルク] | : milk |
| tsumetai [冷たい] | : cold |
| ari [あり] | : * |

Example of example DB

| Dependency relation | : Expression pattern |
|---|---|
| (kohi [コーヒー]→onegai [お願い]) | : I'd like to coffee please. |
| (tsumetai [冷たい]→miruku [ミルク]) (miruku [ミルク]→ari [あり]) | : Do you have a cold milk ? |
| . . . | |

Fig. 2 (b)

Example of tagged corpus

Kohi (common noun) | o (kaku-postpositional particle) | o (prefix) | negai (sahen-noun) | shi (verb) | masu (auxiliary verb)
[コーヒー (一般名詞) | を (格助詞) | お (接頭詞) | 願い (サ変名詞) | し (動詞) | ます (助動詞) ]

Tsumetai (adjective) | miruku (common noun) | ha (kei-postpositional particle) | ari (verb) | masu (auxiliary verb) | ka (shu-postpositional particle) ・・・
[冷たい (形容詞) | ミルク (普通名詞) | は (係助詞) | あり (動詞) | ます (助動詞) | か (終助詞) ]
. . .

Fig. 3

Example of example DB

| Dependency relation | : Expression pattern |
|---|---|
| (kohi [コーヒー] →onegai [お願い]) | : Coffee please. |
| (tsumetai [冷たい] →miruku [ミルク]) (miruku [ミルク] →ari [あり]) | : Any cold milk? |
| . . . | |

Fig. 5 (a)

Classified vocabulary table

| | | |
|---|---|---|
| kohi [コーヒー] | (common noun [一般名詞]) | 100 |
| miruku [ミルク] | (common noun [一般名詞]) | 100 |
| koucha [紅茶] | (common noun [一般名詞]) | 100 |
| ... | | |
| tsumetai [冷たい] | (adjective [形容詞]) | 200 |
| atsui [熱い] | (adjective [形容詞]) | 200 |
| ... | | |

Fig. 5 (b)

Example of example DB

| Key word | : Dependency relation | : Sentence example |
|---|---|---|
| ① 100 ② onegai [お願い] | : (①→②) | : I'd like to ② please. |
| ① 200 ② 100 ③ ari [あり] | : (①→②) (②→③) | : Do you have a ① ② ? |
| ... | | |

Fig. 7

Input sentence : Atsui miruku ha arimasuka [熱いミルクはありますか]

Recognition result sentence : Aoi miruku ha arimasuka [青いミルクはありますか]

Example of example DB

| Dependency relation | Sentence example |
| --- | --- |
| (kohi [コーヒー]→onegai [お願い]) | Coffee please. |
| (atsui [熱い]→miruku [ミルク]) (miruku [ミルク]→ari [あり]) | Any hot milk ? |
| . . . | |

Extracted key words : aoi [青い], miruku [ミルク], ari [あり]

Result of dependency relation comparison between the key words and example DB :

(aoi [青い], miruku [ミルク]) ×
(aoi [青い], ari [あり]) ×
(miruku [ミルク], ari [あり]) ○

Fig. 9(d)

PRIOR ART

63 Inter-phrase rule

| Japanese | English |
|---|---|
| (A) o (B) suru [(A)を(B) する] ↔ | ((B) to (A)) |

Fig. 9(e)

PRIOR ART

64 Classified vocabulary table

X (heya [部屋], kaigishitsu [会議室], kuruma [車], ··· )

Y (yoyaku [予約], keiyaku [契約], ··· )

Z (onegai [お願い], tanomu [たのむ], ··· )

Example of bilingual key word dictionary

| | | |
|---|---|---|
| coffee | : | kohi [コーヒー] |
| please | : | onegai [お願い] |
| milk | : | miruku [ミルク] |
| cold | : | tsumetai [冷たい] |
| have | : | ari [あり] |

Example of example DB

| Dependency relation | Expression pattern |
|---|---|
| (coffee→please) | : Kohi o onegai shimasu [コーヒーをお願いします] |
| (cold→milk) (milk→have) | : Tsumetai miruku ha arimasuka [冷たいミルクはありますか] |
| ... | |

Fig. 10 (b)

Example of tagged corpus

I (pronoun) | 'd (auxiliary verb) | like (verb) | to (determiner) | coffee (common noun) |
please (adverb) |
...

Fig. 11 (a)

Classified vocabulary table

| | | |
|---|---|---|
| coffee | (common noun) | 100 |
| milk | (common noun) | 100 |
| tea | (common noun) | 100 |
| ... | | |
| cold | (adjective) | 200 |
| hot | (adjective) | 200 |
| ... | | |

Fig. 11 (b)

Example of example DB

| Key word | Dependency relation | Sentence example |
|---|---|---|
| ① 100 ② please | ① o [を] ② shimasu [します] | ① o [を] ② shimasu [します] |
| ① 200 ② 100 ③ have | (①→②) (②→③) | ①② ha [は] ③ masuka [ますか] |
| ... | | |

Fig. 12

| | |
|---|---|
| Input sentence | : Do you have a hot milk ? |
| Recognition result sentence | : Do you have a head milk ? |

Example of example DB

| Dependency relation | : Sentence example |
|---|---|
| (coffee→please) | : Kohi o onegai shimasu [コーヒーをお願いします] |
| (hot→milk) (milk→have) | : Atsui miruku ha arimasuka [熱いミルクはありますか] |
| ... | |

Extracted key words : (have, head, milk)

Result of dependency relation comparison between the key words and example DB :

(head, milk) ×

(head, have) ×

(milk, have) ○

Fig. 13 (a)

Example of bilingual key word dictionary

咖啡 ： kohi [コーヒー]
要 ： kudasai [下さい]
日文 ： nihongo [日本語]
菜单 ： menyu [メニュー]
有 ： ari [あり]

Example of example DB

Dependency relation ： Expression pattern (咖啡→要) ： Kohi o kudasai [コーヒーを下さい]
(日文→菜单)(菜单→有) ： Nihongo no menyu ha arimasuka [日本語のメニューはありますか]
...

Fig. 13 (b)

Example of tagged corpus

Classified vocabulary table

| | | |
|---|---|---|
| 咖啡 | (名) | 100 |
| 牛奶 | (名) | 100 |
| 红茶 | (名) | 100 |
| 冷 | (形) | 200 |
| 热 | (形) | 200 |
| 日文 | (名) | 300 |
| 菜単 | (名) | 400 |
| ... | | |

Fig. 14(b)

Example of example DB

| Key word | : Dependency relation | : Sentence example |
|---|---|---|
| ① 100 ② 要 | :(①→②) | : ① o [を] ② |
| ① 300 ② 400 ③ 有 | :(①→②) (②→③) | : ① no [の] ② ha [は] ③ masuka [ますか] |
| | ... | |

Fig. 15

Input sentence : 有日文菜単吗

Recognition result sentence : 有日没菜単吗

Example of example DB

| Dependency relation | : Sentence example |
|---|---|
| ( 咖啡→要 ) | : Kohi o kudasai [コーヒーを下さい] |
| ( 日文→菜単 ) ( 菜単→有 ) | : Nihongo no menyu ha arimasuka [日本語のメニューはありますか] |
| | ... |

Extracted key words : (有, 日没, 菜単)

Result of dependency relation comparison between the key words and example DB :

(日没, 有) ×

(日没, 菜単) ×

(菜単, 有) ○

METHOD AND APPARATUS FOR CONVERTING AN EXPRESSION USING KEY WORDS

BACKGROUND OF THE INVENTION

1. Field of the Invention

The present invention relates to an expression converting method, an expression converting apparatus and a program that convert the expression of an input sentence and output an expression into which the expression of the input sentence is converted, for example, to an expression converting method, an expression converting apparatus and a program that perform language conversion such as translation or interpretation, sentence pattern conversion to convert written language into spoken language, or summary creation to summarize a complicated or redundant sentence and output a summary.

2. Description of the Related Art

A conventional technology will be described with an interpretation software program as an example.

An interpretation software program comprises voice recognizing means and language translating means, and realizes interpretation by successively executing voice recognition for converting a voiced sentence input as an acoustic signal into an output sentence represented as a word text string, and language translation as expression conversion to translate an input sentence represented as a word text string into a sentence in another language.

The language translating means executing language translation in a manner as described above comprises: language analyzing means of analyzing the syntactic or semantic construction of the input sentence; language converting means of converting the input sentence into another language based on the result of the analysis; and output sentence generating means of generating a natural output sentence from the result of the translation.

In interpretation software programs and some translation software programs, to correctly translate ungrammatical casual expressions which are frequently used in spoken language, a technique is frequently used such that a language analysis according to grammatical rules is not performed but sentence examples similar to actually input sentences are learned and the similar sentence examples are searched to perform language analysis. An example of such conventional interpretation software programs will be described with reference to the example shown in FIG. 8.

Here, a case will be described in which a voiced sentence example in Japanese is interpreted into a voiced sentence example in English. The language to be interpreted will be referred to as the original language, and the language into which the original language is to be interpreted will be referred to as the target like to reserve a room," and these are divided into the following two bilingual phrases: (A) "heya no yoyaku (部屋の予約)" and "reserve a room" as the bilingual phrase (A) 71; and (B) "onegai shitain desuga (お願いしたいんですが)" and "I'd like to" as the bilingual phrase (B) 72.

The content words such as "heya (部屋)," "yoyaku (予約)" and "onegai (お願い)" are represented as variables X, Y and Z, respectively, by use of a classified vocabulary table 64 previously created as shown in FIG. 9-2(*e*). Here, the classified vocabulary table 64 is a table listing the content words which the variables can take as their values. For example, the variable X takes a value such as "heya (部屋)," "kaigishitsu (会議室)" or "kuruma (車)," and the content word "heya (部屋)" is a value which the variable X can take. Therefore, the content word "heya (部屋)" of the bilingual phrase (A) 71 is replaced with the variable X.

In this manner, two bilingual phrase rules (A) "X no Y (X の Y)" "YX" and (B) "Z shitain desuga (したいんですが)" "I'd like to" are written into the bilingual phrase dictionary 62.

In order that the ordinal relations of the phrases are made rules, as shown in FIG. 9-2(*d*) as an inter-phrase rule 63, inter-phrase relations such as "(A) o (B) ((A) を (B))" "(B) (A)" are stored in the inter-phrase rule table 63. This processing is performed on all the voiced sentences in the bilingual corpus 1.

In performing interpretation, first, an original language voice is input to voice recognizing means 64. The voice recognizing means 64 outputs as a voice recognition candidate the acoustically most similar word string, for example, from among the word strings written in the bilingual phrase dictionary 62 as phrases and the word strings that can be presumed from the phrase strings written in the inter-phrase rule 63.

Language translating means 65 receives consecutive word strings recognized in this manner, converts the input consecutive word strings into phrase strings written in the bilingual phrase dictionary 62, and searches for the inter-phrase rule 63 corresponding to each phrase string. Then, the language translating means 65 converts the input original language recognition result sentence into a target language sentence based on the target language phrase equivalent to each phrase and the inter-phrase rule of the target language.

The obtained target language sentence is input to output sentence generating means 66 which corrects grammatical unnaturalness of the target language sentence. For example, the output sentence generating means 66 performs processing such as optimization of a pronoun, a verb and an auxiliary verb, for example, conversion into the third person form, the plural form or the past form, and optimization of the overall structure of the sentence. The target language translation result sentence having undergone the correction is output, for example, as a text.

However, the conventional interpretation software program has, although having an advantage that ungrammatical input sentences can be handled, a problem that since a multiplicity of different bilingual phrases and combinations thereof are written as rules as they are, the conversion rules are complicated and enormous in volume and consequently, it takes much time for the program to perform processing.

Moreover, complicated rules are necessary for the grammar check performed by the output sentence generating portion; particularly, with respect to interpolation of zero pronouns, there is no technology by which zero pronouns can completely and correctly be interpolated, and interpolation is sometimes erroneously performed.

In addition, when a partially erroneous sentence is input to the language translating portion because of a voice recognition error or the like, since language conversion is performed based on erroneous in-phrase and inter-phrase rules, a translation result conveying no intention at all is output.

SUMMARY OF THE INVENTION

An object of the present invention is, in view of the above-mentioned problems, to provide an expression converting method, an expression converting apparatus and a program being compact in structure and capable of high-speed processing.

Another object of the present invention is, in view of the above-mentioned problems, to provide an expression converting method, an expression converting apparatus and a program capable of, even when a part other than the key words of the input sentence is erroneously recognized because of a voice recognition error or the like outputting a result correctly conveying the intention without the quality of the output sentence adversely affected.

Still another object of the present invention is, in view of the above-mentioned problems, to provide an expression converting method, an expression converting apparatus and a program capable of, even when a part of the input sentence is erroneously recognized because of a voice recognition error or the like, avoiding the conventional problem that a result not conveying the sentence meaning at all is output.

One aspect of the present invention is an expression converting method wherein for each sentence in a corpus, key words are selected from the sentence, a combination of key words that are in a co-occurrence relation is identified from among a predetermined number of combinations of key words among the selected key words, and the identified key word combination and an expression into which the sentence from which the key words are selected is converted are previously associated, and wherein predetermined key words are selected from an input sentence, the selected key words are combined, the key word combinations and the previously identified key word combination of each sentence are compared, one or more than one sentences that coincide or have a high degree of similarity as a result of the comparison are selected, and expressions into which the selected sentences are converted are output.

Another aspect of the present invention is an expression converting method wherein by use of classing information in which key words are previously classed based on predetermined properties and each class is provided with a name, for each sentence in a corpus, key words are selected from the sentence, a combination of classes that are in a co-occurrence relation are identified from among a predetermined number of combinations of classes among classes to which the selected key words belong, and the identified class combination and an expression into which the sentence from which the key words are selected is converted are previously associated, and wherein predetermined key words are selected from an input sentence, classes to which the selected key words belong are combined, the class combinations and the previously identified class combination of each sentence are compared, one or more than one sentences that coincide or have a high degree of similarity as a result of the comparison are selected, and expressions into which the selected sentences are converted are output.

Still another aspect of the present invention is an expression converting method wherein for each sentence in a corpus, key words are selected from the sentence, a combination of key words that are in a co-occurrence relation is identified from among a predetermined number of combinations of key words among the selected key words, and the identified key word combination and an expression into which the sentence from which the key words are selected is converted are previously associated, wherein by use of classing information in which key words are previously classed based on predetermined properties and each class is provided with a name, the identified keyword combination is associated with a class combination to thereby identify a class combination of the sentence, and wherein predetermined key words are selected from an input sentence, classes to which the selected key words belong are combined, the class combinations and the previously identified class combination of each sentence are compared, one or more than one sentences that coincide or have a high degree of similarity as a result of the comparison are selected, and expressions into which the selected sentences are converted are output.

Yet another aspect of the present invention is an expression converting apparatus comprising:

associating means of, for each sentence in a corpus, selecting key words from the sentence, identifying a combination of key words that are in a co-occurrence relation from among a predetermined number of combinations of key words among the selected key words, and previously associating the identified key word combination and an expression into which the sentence from which the key words are selected is converted; and converting means of selecting predetermined keywords from an input sentence, combining the selected key words, comparing the key word combinations and the previously identified key word combination of each sentence, selecting one or more than one sentences that coincide or have a high degree of similarity as a result of the comparison, and outputting expressions into which the selected sentences are converted.

Still yet another aspect of the present invention is an expression converting apparatus, wherein when the degree of similarity is high as the result of the comparison, said converting means outputs the selected expression after removing a part into which a key word is converted is removed from the selected expression, said key word belonging to the key word combination that does not coincide and not being included in the key word combination that coincides.

A further aspect of the present invention is an expression converting apparatus, wherein said expression into which the sentence is converted comprises only key words or words equivalent to the key words.

A still further aspect of the present invention is an expression converting apparatus comprising:

associating means of, by use of classing information in which key words are previously classed based on predetermined properties and each class is provided with a name, for each sentence in a corpus, selecting key words from the sentence, identifying a combination of classes that are in a co-occurrence relation from among a predetermined number of combinations of classes among classes to which the selected key words belong, and previously associating the identified class combination and an expression into which the sentence from which the key words are selected is converted; and converting means of selecting predetermined key words from an input sentence, combining classes to which the selected key words belong, comparing the class combinations and the previously identified class combination of each sentence, selecting one or more than one sentences that coincide or have a high degree of similarity as a result of the comparison, and outputting expressions into which the selected sentences are converted.

The 8th invention of the present invention (corresponding to claim 8) is an expression converting apparatus comprising:

associating means of, for each sentence in a corpus, selecting key words from the sentence, identifying a combination of key words that are in a co-occurrence relation from among a predetermined number of combinations of key words among the selected key words, and previously associating the identified key word combination and an expression into which the sentence from which the key words are selected is converted, and by use of classing information in which key words are previously classed based on predetermined properties and each class is provided with a name, associating the identified key word combination with a class combination to thereby identify a class combination of the sentence; and converting means of selecting predetermined key words from an input sentence, combining classes to which the selected key words belong, comparing the class combinations and the previously identified class combination of each sentence, selecting one or more than one sentences that coincide or have a high degree of similarity as a result of the comparison, and outputting expressions into which the selected sentences are converted.

A still yet further aspect of the present invention is an expression converting apparatus, wherein when the degree of similarity is high as the result of the comparison, said converting means outputs the selected expression after removing a part into which a class is converted is removed from the selected expression, said class belonging to the class combination that does not coincide and not being included in the class combination that coincides.

The 10th invention of the present invention (corresponding to claim 10) is an expression converting apparatus according to 7th or 8th inventions, wherein said expression into which the sentence is converted comprises only class.

A Still additional aspect of the present invention is a program for causing a computer to function as all or part of the following means of the expression converting apparatus:

the associating means of, for each sentence in a corpus, selecting key words from the sentence, identifying a combination of key words that are in a co-occurrence relation from among a predetermined number of combinations of key words among the selected key words, and previously associating the identified key word combination and an expression into which the sentence from which the key words are selected is converted; and the converting means of selecting predetermined keywords from an input sentence, combining the selected key words, comparing the key word combinations and the previously identified key word combination of each sentence, selecting one or more than one sentences that coincide or have a high degree of similarity as a result of the comparison, and outputting expressions into which the selected sentences are converted.

A yet additional aspect of the present invention is a program for causing a computer to function as all or part of the following means of the expression converting apparatus:

the associating means of, by use of the classing information in which key words are previously classed based on predetermined properties and each class is provided with a name, for each sentence in a corpus, selecting key words from the sentence, identifying a combination of classes that are in a co-occurrence relation from among a predetermined number of combinations of classes among classes to which the selected key words belong, and previously associating the identified class combination and an expression into which the sentence from which the key words are selected is converted; and the converting means of selecting predetermined key words from an input sentence, combining classes to which the selected key words belong, comparing the class combinations and the previously identified class combination of each sentence, selecting one or more than one sentences that coincide or have a high degree of similarity as a result of the comparison, and outputting expressions into which the selected sentences are converted.

A still yet additional aspect of the present invention is a program for causing a computer to function as all or part of the following means of the expression converting apparatus:

the associating means of, for each sentence in a corpus, selecting key words from the sentence, identifying a combination of key words that are in a co-occurrence relation from among a predetermined number of combinations of key words among the selected key words, and previously associating the identified key word combination and an expression into which the sentence from which the key words are selected is converted, and by use of the classing information in which key words are previously classed based on predetermined properties and each class is provided with a name, associating the identified key word combination with a class combination to thereby identify a class combination of the sentence; and the converting means of selecting predetermined key words from an input sentence, combining classes to which the selected key words belong, comparing the class combinations and the previously identified class combination of each sentence, selecting one or more than one sentences that coincide or have a high degree of similarity as a result of the comparison, and outputting expressions into which the selected sentences are converted.

Next, operations of the present invention will be described.

According to the present invention, by extracting keywords from the input sentence, converting the input sentence into a standard or simplified expression sentence representative of the same meaning by use of the extracted key words, and outputting the expression sentence, the conversion rules and the sentence generation rules can be made compact, so that expression conversion can be performed with simple processing. Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, according to the present invention, by extracting, as key words, words which are some of the content words included in the input sentence or the words into which the words which are some of the content words are converted, and generating a standard or simplified expression sentence comprising a combination of the key words and the expression decided by the sentence meaning presumed from the input sentence, the conversion rules and the sentence generation rules can be made compact, so that expression conversion can be performed with simple processing. Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, according to the present invention, by extracting key words from the input sentence, presuming the sentence meaning from the co-occurrence relation between the extracted keywords or the co-occurrence relation, and generating a standard or simplified expression from a combination of only words predetermined from the key words or the equivalents of the key words and the presumed intention, the conversion rules and the sentence generation rules can be made compact, so that expression conversion can be performed with simple processing. Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, according to the present invention, by previously creating an example database in which output standard or simplified expression patterns, the key word groups corresponding to the patterns and the co-occurrence relation between key word groups or the co-occurrence relation are associated, extracting a key word group from the input sentence, selecting from the example database an expression pattern including the key word group most similar to the extracted key word group, and outputting the selected sentence example, in addition to the above-mentioned effects of the present invention, expression conversion can accurately be performed faithfully to the kind, the domain and the sentence pattern of the actually input sentence.

Moreover, according to the present invention, by the expression patterns written in the example database each consisting of only key words or equivalents of the key words, the effects can be enhanced.

Moreover, according to the present invention, by the description of the expression patterns written in the example database, the key word groups and the co-occurrence relation between the key word groups or the key words that are in a co-occurrence relation being a description of classes of words including the key words, in addition to the above-mentioned effects of the present invention, even when a key word not included in the example database is input, an appropriate sentence example can be selected, so that expression conversion capable of handling a wider variety of input sentences is enabled.

Moreover, according to the present invention, by extracting a key word group from the input sentence, presuming an input error word from the relation between the extracted key words, presuming the sentence meaning from the key words other than the key word presumed to be an input error word, and generating a standard or simplified expression from a word combination decided by the presumed sentence meaning, in addition to the effects described above in the present invention, even when a key word is erroneous, according to the degree of seriousness of the error, it is possible to convert the input sentence into an expression of which meaning can correctly be understood or to notify the user that the meaning cannot be understood, so that the conventional problem that an expression conversion result in which an erroneous part remains is output can be solved.

BRIEF DESCRIPTION OF THE DRAWINGS

FIG. 2(*a*) is a view showing an example of a bilingual key word dictionary and an example of an example DB used in the first embodiment of the present invention;

FIG. 2(*b*) is a view showing an example of a tagged corpus used in the first embodiment of the present invention;

FIG. 3 is a view showing the example DB used in the first embodiment of the present invention;

FIG. 5(*a*) is a view showing a classified vocabulary table used in the second embodiment of the present invention;

FIG. 5(*b*) is a view showing an example DB used in the second embodiment of the present invention;

FIG. 7 is a view showing an example DB used in the third embodiment of the present invention;

FIG. 9(*b*) is a view showing the examples of the conventional bilingual phrases;

FIG. 9(*c*) is a view showing the example of the conventional bilingual phrase dictionary;

FIG. 9(*d*) is a view showing the example of the conventional inter-phrase rules; and FIG. 9(*e*) is a view showing the example of the conventional classified vocabulary table.

FIG. 10(*a*) is a view showing an example of a bilingual key word dictionary and an example of an example DB used in case of converting an English sentence into a Japanese sentence in the first embodiment of the present invention;

FIG. 10(*b*) is a view showing an example of a tagged corpus used in case of converting an English sentence into a Japanese sentence in the first embodiment of the present invention;

FIG. 11(*a*) is a view showing a classified vocabulary table used in case of converting an English sentence into a Japanese sentence in the second embodiment of the present invention;

FIG. 11(*b*) is a view showing an example DB used in case of converting an English sentence into a Japanese sentence in the second embodiment of the present invention;

FIG. 12 is a view showing an example DB used in case of converting an English sentence into a Japanese sentence in the third embodiment of the present invention;

FIG. 13(*a*) is a view showing an example of a bilingual key word dictionary and an example of an example DB used in case of converting a Chinese sentence into Japanese sentence in the first embodiment of the present invention;

FIG. 13(*b*) is a view showing an example of a tagged corpus used in case of converting a Chinese sentence into Japanese sentence in the first embodiment of the present invention;

FIG. 14(*a*) is a view showing a classified vocabulary table used in case of converting a Chinese sentence into Japanese sentence in the second embodiment of the present invention;

FIG. 14(*b*) is a view showing an example DB used in case of converting a Chinese sentence into Japanese sentence in the second embodiment of the present invention;

FIG. 15 is a view showing an example DB used in case of converting a Chinese sentence into Japanese sentence in the third embodiment of the present invention;

EXPLANATION OF REFERENCE NUMERALS

1 Tagged corpus

2 Dependency relation analyzing means

3, 11 Example database

4 Speech recognizing means

5 Key word extracting means

6, 16 Bilingual key word dictionary

7, 14 Sentence example selecting means

8, 15 Output sentence generating means

12 Classified vocabulary table

13 Word classing means

21 Erroneously recognized word presuming means

DESCRIPTION OF THE PREFERRED EMBODIMENTS

Hereinafter, embodiments of the present invention will be described with reference to the drawings.

(First Embodiment)

First, a first embodiment will be described. In the first embodiment, an interpreting apparatus will be described that converts an original language sentence input by voice (hereinafter, a sentence to be expression-converted will be referred to as an original language sentence) into a target language sentence in another language (hereinafter, a sentence having undergone the expression conversion will be referred to as a target language sentence).

Figure 1:
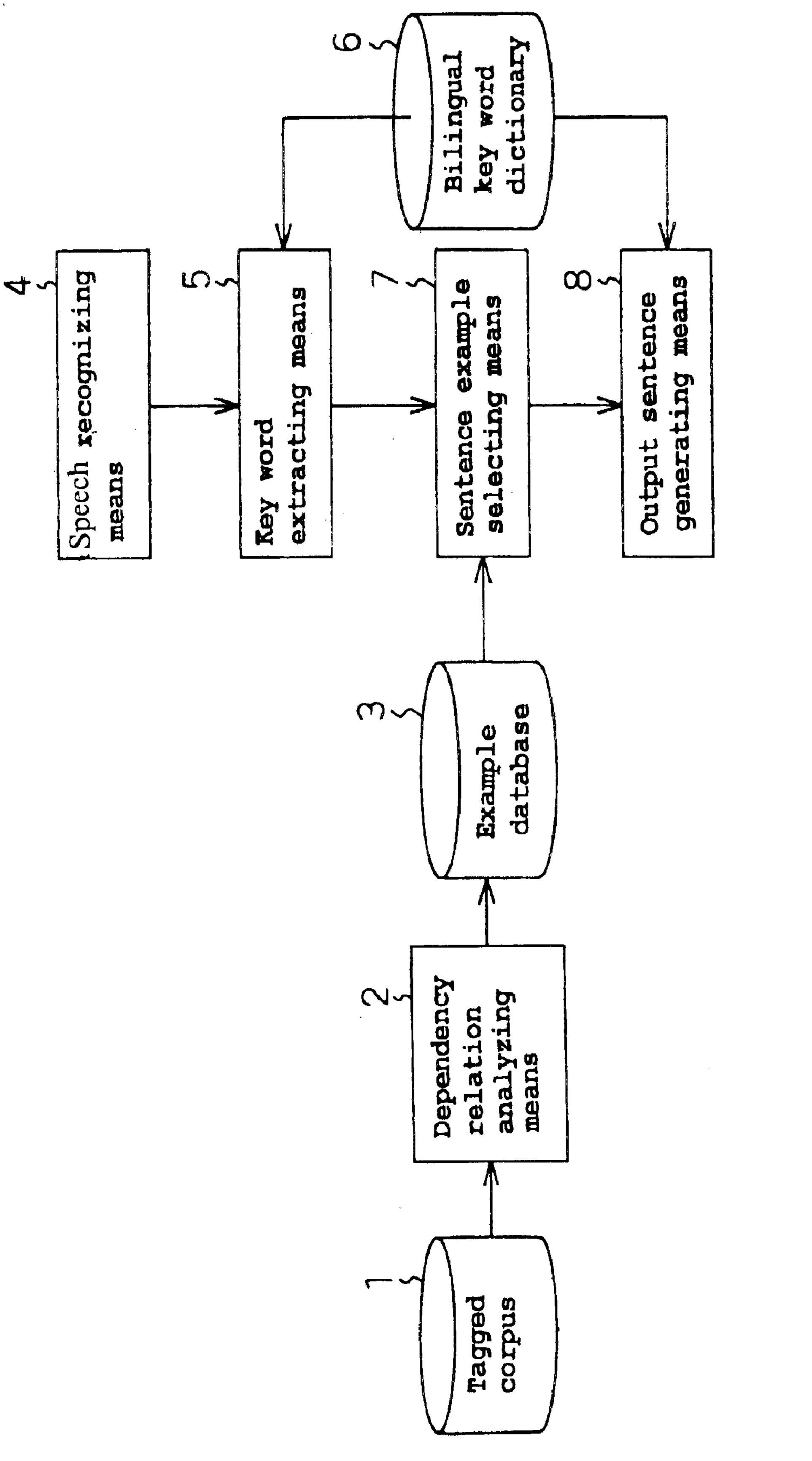
FIG. 1 is a view showing an interpreting apparatus according to a first embodiment of the present invention.

FIG. 1 shows the structure of an interpreting apparatus according to an embodiment of the present invention.

The Interpreting apparatus of this embodiment comprises a tagged corpus 1, dependency relation analyzing means 2, an example DB 3, speech recognizing means 4, key word extracting means 5, sentence example selecting means 7, output sentence generating means 8, and a bilingual key word dictionary 6.

The tagged corpus 1 is a bilingual corpus in which an intention tag is added to each of the bilingual sentences.

The dependency relation analyzing means 2 creates the example DB 3 by analyzing a co-occurrence relation between key words for each of the bilingual sentences in the tagged corpus 1.

In the example DB 3, sentence examples in which key word pairs representative of co-occurrence relations between keywords of original language sentences are associated with target language sentences are stored.

The voice recognizing means 4 voice-recognizes the voice input as an original language sentence, and outputs a word string candidate.

The key word extracting means 5 receives the word string candidate output from the voice recognizing means 4, and extracts predetermined key words from the word string candidate.

The sentence example selecting means 7 compares key word pairs created by combining the key words in the input sentence with the key word pairs in each sentence example in the example DB 3, selects a sentence example the largest number of which key word pairs is included in the input sentence, as the sentence example of which meaning is most similar to that of the input sentence, and outputs the selected sentence example.

The output sentence generating means 8 corrects grammatical unnaturalness of the output sentence example, and outputs the corrected sentence example as a target language sentence, for example, in text form or by voice.

In the bilingual key word dictionary 6, key words in the original language (hereinafter, the language to be expression-converted will be referred to as the original language) and the equivalents in the target language (hereinafter, the language of the sentence having undergone the expression conversion will be referred to as the target language) for the key words are paired and stored.

Next, an operation of this embodiment structured as described above will be described.

It is necessary for the interpreting apparatus of this embodiment to do the following before performing interpretation: deciding the contents of key words and the correspondence between key word groups and target language expression patterns; writing the equivalents in the target language for the key words into the bilingual key word dictionary 6; and writing the correspondence between the keyword groups and the target language expression patterns into the example DB 3.

To do so, first, for each input sentence meaning, key words representative of an intention, and expression patterns using the key words may be manually decided by the developer. Alternatively, the following may be performed: An intention tag is added to each of the bilingual sentences in a bilingual corpus, the bilingual corpus is classified according to the intention, words shared among the sentence meanings are selected as key word candidates, and key words and expression patterns are semiautomatically decided by the developer checking the key word candidates. The sentence meaning refers to a unit of one or more than one different sentences expressing a similar intention. The bilingual corpus is a database of sentence examples in which a multiplicity of bilingual sentences are stored. The bilingual sentences each comprise a sentence in the original language and a sentence in the target language associated with each other.

From the key words and the expression patterns decided by any of the above-described methods, a bilingual key word dictionary and an example DB for conversion are created. FIG. 2(*a*) shows an example of the bilingual key word dictionary 6 and an example of the example DB 3 used in a case where the original language is Japanese and the target language is English, that is, in a case where the interpreting apparatus of this embodiment interprets a voice in Japanese into a voice in English.

In the example of the bilingual key word dictionary 6 of FIG. 2(*a*), as the equivalent of a Japanese word "kohi (コーヒー)," an English word "coffee" is written, and as the equivalent of a Japanese word "miruku (ミルク)," an English word "milk" is written. As the equivalent of a Japanese word "onegai (お願い)" which cannot be represented by a single English word, "*" is written in the place where the English equivalent is to be written.

In the example of the example DB 3 of FIG. 2(*a*), a key word group of "kohi (コーヒー)" and "onegai (お願い)" is associated with a target language expression pattern "I'd like to coffee please." Likewise, a key word group of "tsumetai (冷たい)," "miruku (ミルク)" and "ari (あり)" is associated with a target language expression pattern "Do you have a cold milk?"

Moreover, in the example of the example DB 3 of FIG. 2(*a*), in each key word group, the key words are paired like (kohi (コーヒー) →miruku (ミルク)). Like this, the key words written in the example DB 3 are paired without exception. These key word pairs each represent a co-occurrence relation between the key words, and are created by the dependency relation analyzing means 2 in the following manner:

First, the dependency relation analyzing means 2 performs a dependency structure analysis for the original language sentence in the tagged corpus 1 to clarify the dependency structure of each phrase. When a pair of key words that are in a co-occurrence relation in the dependency structure relation is present, the information thereon is added to the corresponding key words and expression pattern pair in the example DB 3. Specifically, since key words "kohi (コーヒー)" and "onegai (お願い)" are in a co-occurrence relation for an original language sentence "kohi onegai (コーヒーお願い)," as shown in FIG. 2(*a*), the co-occurrence relation is added like "(kohi (コーヒー)→onegai (お願い)" where the key words are paired.

In this manner, the bilingual key word dictionary 6 and the example DB 3 as shown in FIG. 2(*a*) are created from the tagged corpus 1, and the co-occurrence relations between the key words are added to the example DB 3.

Next, an operation to perform interpretation by use of the example DB 3 and the bilingual key word dictionary 6 previously created in the above-described manner will be described.

In performing Interpretation, first, the speech recognizing means, or the voice recognizing means 4 voice-recognizes the Input original language voice, and outputs a word string candidate which is the result of the recognition. Then, the result of the recognition is input to the key word extracting means 5. For example, when the Input original language voice is "Tsumetai kohi arimasuka? (冷たいコーヒーありますか)," as a result of the voice recognition, a recognition result sentence "Tsumetai kohi arimasuka? (冷たいコーヒーありますか)," is output to the key word extracting means.

Then, the key word extracting means 5 extracts predetermined key words from the recognition result sentence, and outputs the extracted key words to the sentence example selecting means 7. For example, from the recognition result sentence "Tsumetai kohi arimasuka? (冷たいコーヒーありますか)," the key word extracting means 5 extracts three key words "tsumetai (冷たい)," "kohi(コーヒー)" and "ari(あり)."

Then, the sentence example selecting means 7 creates key word pairs in the input sentence by combining the key words in the input sentence that are output from the key word extracting means 5. Then, the sentence example selecting means 7 compares the key word pairs in the input sentence with the key word pairs in each sentence example in the example DB 3, selects a sentence example including the largest number of the key word pairs in the input sentence, as the sentence example of which meaning is most similar to that of the input sentence, and outputs the selected sentence example.

For example, the three key words "tsumetai (冷たい)," "kohi (コーヒー)" and "ari(あり)" in the input sentence are combined to create three key word pairs "(tsumetai (冷たい)→kohi (コーヒー))," "(kohi (コーヒー)→ari あり))" and "(tsumetai (冷たい)→ari (あり))."

Then, the key word pairs in the input sentence are compared with the key word pair in the first sentence example in the example DB 3. Since the key word pair in the first sentence example is "(kohi (コーヒー)→onegai (お願い)," none of the key word pairs in the input sentence is included in the first sentence example.

Then, the key word pairs in the input sentence are compared with the key word pairs in the second sentence example in the example DB 3. There are two key word pairs "(tsumetai (冷たい)→miruku (ミルク))" and "(miruku (ミルク)→ari (あり))" in the second sentence example. Of the key word pairs in the input sentence, "(tsumetai (冷たい)→miruku (ミルク)" and "(miruku (ミルク)→ari (あり))" are included although "(tsumetai (冷たい)→ari (あり))" is not included. Therefore, the second sentence example includes two of the key word pairs in the input sentence.

Assume that as a result of comparing the key word pairs in the input sentence with the key word pairs in all the sentence examples in the example DB 3 in this manner, the second sentence example includes the largest number of the key word pairs in the input sentence. Then, the second sentence example is selected as the sentence example of which meaning is most similar to that of the input sentence, and is output. That is, a target language expression pattern "Do you have a cold milk?" is output from the sentence example selecting means 7.

While the output sentence generating means 8 is shown in FIG. 1, it is not necessary to provide the output sentence generating means 8; the apparatus can function as an interpreting apparatus by outputting the target language expression pattern output from the sentence example selecting means 7, to the outside as it is.

As described above, according to this embodiment, the example DB 3 in which standard or simplified expression patterns of output target language sentences, the key word groups corresponding to the patterns and the co-occurrence relation between the key words are associated is previously created, key words are extracted from the input sentence, the expression pattern including the key word group most similar to the extracted key word group is selected from the example DB 3, and the selected expression pattern is output. Consequently, even in a case where the output sentence generating means 8 is provided and the output sentence generating means 8 uses conversion rules and sentence generation rules to perform correction of grammatical unnaturalness such as: optimization of a pronoun, a verb and an auxiliary verb, for example, conversion into the third person form, the plural form or the past form; interpolation of zero pronouns; and optimization of the overall structure of the sentence, the conversion rules and the sentence generation rules can be made compact, so that expression conversion can be performed at high speed with simple processing.

Moreover, even when a sentence that is erroneous in a part other than the key words is input, the input sentence can be converted into an expression of which meaning can correctly be understood, so that the conventional problem that an expression conversion result in which an erroneous part remains is output can be solved. For example, even when a sentence such as "Tsumetai miruku etto arimasuka (冷たいミルクえーっとありますか)" or "Tsumetaino miruku arimasuka (冷たいのミルクありますか)" that is erroneous in a part other than the key words such as "etto (えーっと)" or "no (の)" is input, the input sentence can be converted language.

Figure 8:
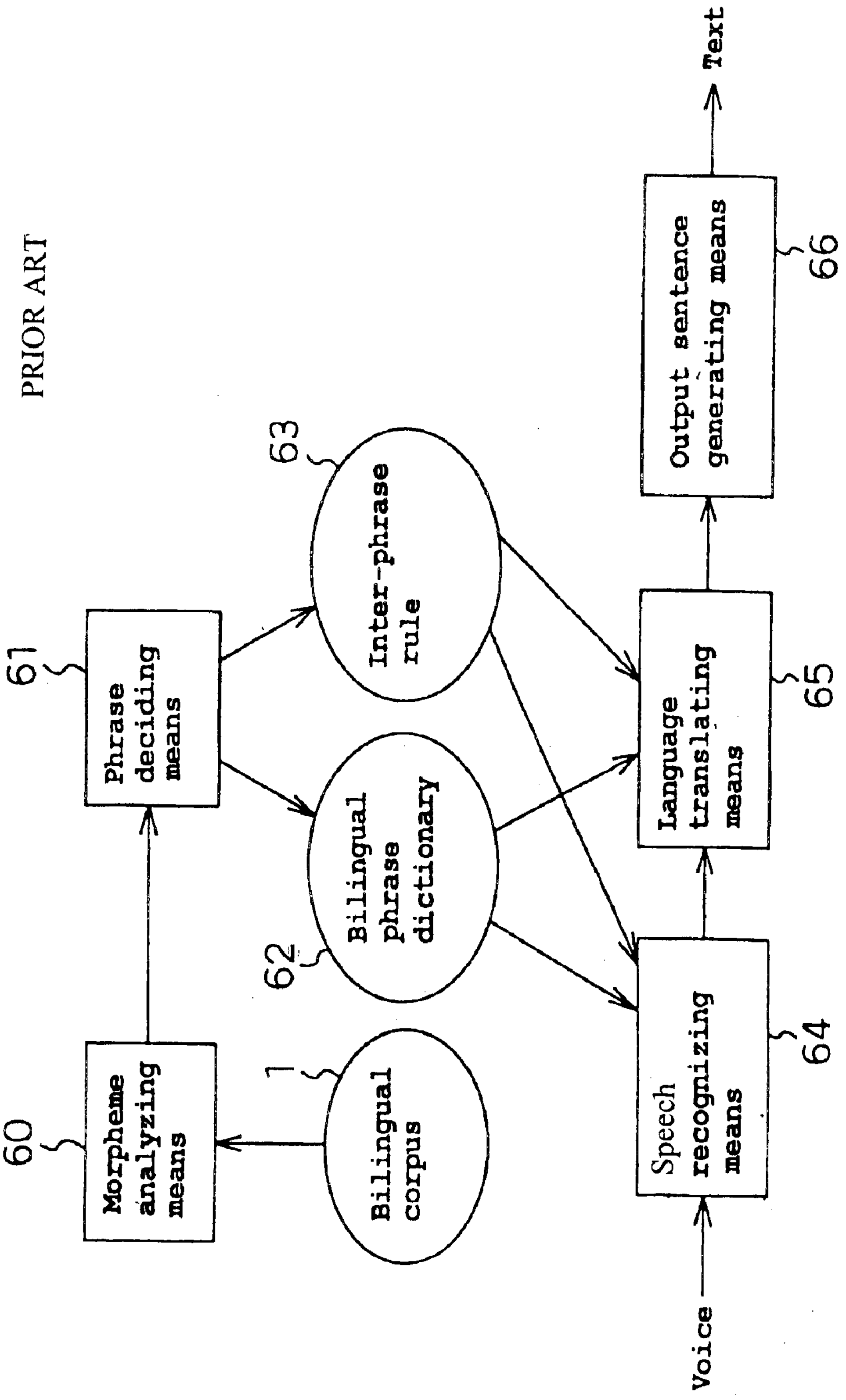
FIG. 8 is a view showing the structure of the conventional interpreting apparatus.
Figure 9A:
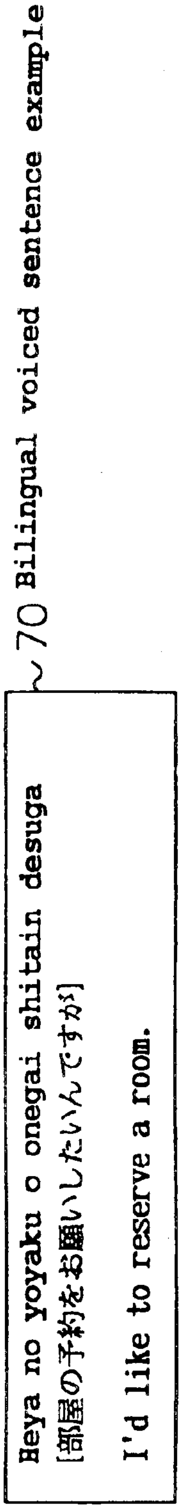
FIG. 9(*a*) is a view showing the example of the conventional bilingual voiced sentence examples.
Figure 9B:
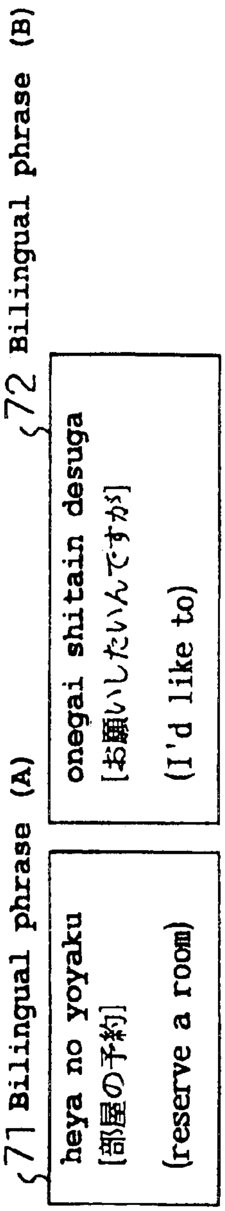
Figure 9C:
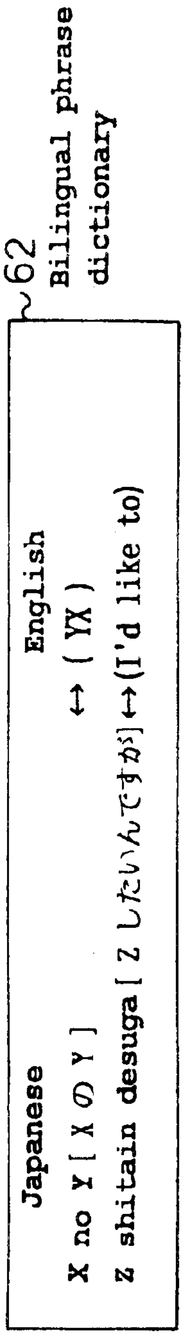

Before interpretation is performed, a voiced sentence rule is extracted from the bilingual corpus 1 of FIG. 8. In the bilingual corpus 1, a plurality of bilingual voiced sentence examples each comprising a pair of a Japanese voiced sentence example and an English voiced sentence example equivalent to each other are written. In FIG. 9-1 (*a*), an example of the bilingual voiced sentence examples written in the bilingual corpus 1 is shown as a bilingual voiced sentence example 70.

Here, considering a case where some of the words are erroneously recognized or omitted when the sentence is voiced, voiced sentence examples are each divided into the smallest units as semantic units (hereinafter, referred to as phrases), and in-phrase rules and inter-phrase dependency relation rules are created.

First, phrase deciding means 61 divides the bilingual voiced sentence example into phrases. In FIG. 9-1(*b*), bilingual phrases thus obtained are shown as a bilingual phrase (A) 71 and a bilingual phrase (B) 72.

Then, a bilingual phrase dictionary creating portion 62 creates a corresponding phrase dictionary 62 in a format where the content words in the phrases are converted into variables.

For example, the bilingual voiced sentence example 70 shown in FIG. 9-1(*a*) comprises voiced sentence examples "Heya no yoyaku o onegai shitain desuga (部屋の予約をお願いしたいんですが)" and "I'd into an expression of which meaning can correctly be understood like "Do you have a cold milk?"

While a case where only one sentence example is selected by the sentence example selecting means 3 is described in this embodiment, when more than one sentence examples have an equal degree of similarity as a result of comparing the extracted key word pairs with the key word pairs in the sentence examples in the example DB 3, the more than one sentence examples are output.

In a case where the expression patterns written in the previously created example DB 3 consist of only key words as shown in FIG. 3, it is unnecessary to provide the output sentence generating means 8, or when the output sentence generating means 8 is provided and the conversion rules and the sentence generation rules are used, the conversion rules and the sentence generation rules can further be made compact, so that a highly effective interpreting apparatus can be realized.

(Second Embodiment)

Next, a second embodiment will be described.

Figure 4:
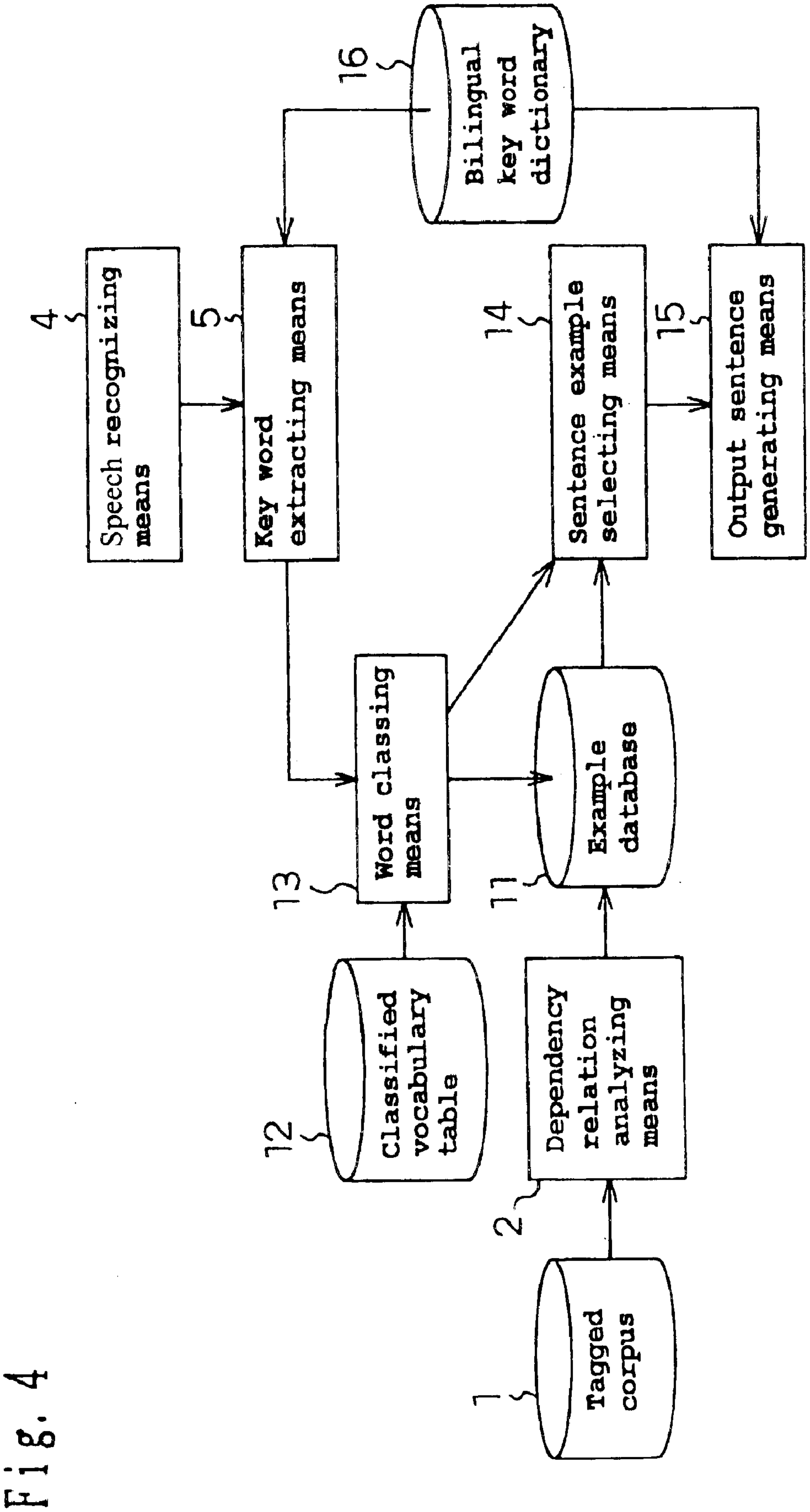
FIG. 4 is a view showing an interpreting apparatus according to a second embodiment of the present invention.

FIG. 4 shows the structure of an interpreting apparatus according to an embodiment of the present invention.

An example DB 11 is different from the example DB of the first embodiment in that key words are classed and replaced with meaning codes representative of classes.

In a classified vocabulary table 12, each key word is assigned a meaning code representative of which class the key word belongs to.

Word classing means 13 replaces the key words in the example DB 11, the pair of key words that are in a co-occurrence relation and the key words included in the conversion rules with meaning codes based on the meaning codes in the classified vocabulary table 12 to thereby class the key words, and replaces the key words extracted by key word extracting means 5 with meaning code based on the meaning codes in the classified vocabulary table to thereby class the key words.

Sentence example selecting means 14 compares the key word classes in the input sentence with the key word class pairs in each sentence example, and selects a sentence example the largest number of which key word class pairs is included in the input sentence, as the sentence example of which meaning is most similar to that of the input sentence.

Output generating means 15 returns the key word class in the selected sentence example to the input key words included in the same class, and outputs the key words.

Except these, the structure is the same as that of the first embodiment.

Next, an operation of this embodiment structured as described above will be described.

In the interpreting apparatus of this embodiment, like in the first embodiment, before interpretation is performed, the contents of key words and the correspondence between key word groups and target language expression patterns are decided and written into a bilingual key word dictionary 16 and the example DB11. Then, the dependency relation analyzing means 2 similarly adds the pair of key words that are in a co-occurrence relation in the dependency structure relation to the expression pattern pair.

Further, the word classing means 13 replaces the key words in the example DB 11, the pair of key words that are in a co-occurrence relation and the key words included in the conversion rules with meaning codes based on the meaning codes in the classified vocabulary table 12 to thereby class the key words.

FIG. 5(*a*) shows an example of the classified vocabulary table 12. FIG. 5(*b*) shows the example DB 11.

In the classified vocabulary table 12 shown in FIG. 5(*a*), the meaning code of words representative of beverages such as "kohi (コーヒー)" is 100, and the meaning code representative of the condition of a beverage such as "tsumetai (冷たい)" is 200. Like this, the key words in the classified vocabulary table 12 are each classed by being assigned a meaning code.

In the example of the example DB 11 shown in FIG. 5(*b*), using the meaning codes assigned to the key words in the classified vocabulary table 12, the key words that occur in the example of the example DB 3 of FIG. 2 described in the first embodiment are represented by meaning codes.

Next, an operation to perform interpretation by use of the example DB 11 and the bilingual key word dictionary 16 previously created in the above-described manner will be described.

In performing interpretation, first, an original language voice is input to the recognizing means 4, and the voice recognizing means 4 voice-recognizes the input original language voice, and outputs a word string candidate which is the result of the recognition. Then, the result of the recognition is input to the key word extracting means 5.

Then, the key word extracting means 5 extracts predetermined key words from the recognition result sentence.

Then, the word classing means 13 replaces the extracted key words with meaning codes based on the meaning codes in the classified word meaning 12 to thereby class the key words.

Then, the sentence example selecting means 14 creates key word class pairs in the input sentence by combining the classes of the key words in the input sentence that are classed by the word classing means 13. Then, the sentence example selecting means 14 compares the key word class pairs in the input sentence with the key word class pair in each sentence example in the example DB 11, and selects a sentence example the largest number of which key word class pairs is included in the input sentence, as the sentence example of which meaning is most similar to that of the input sentence.

The output sentence generating means 15 returns the key word classes in the sentence example selected by the sentence example selecting means 14 to the input key words included in the same class, replaces the key words with the equivalents of the input key words by use of the bilingual key word dictionary 16, and outputs them.

While a case where only one sentence example is selected by the sentence example selecting means 14 is described in this embodiment, when more than one sentence examples have an equal degree of similarity as a result of comparing the pairs of the classes of the extracted key words with the class pairs in the sentence examples in the example DB 3, the more than one sentence examples are output.

As described above, according to this embodiment, the example DB 11 in which standard or simplified expression patterns of output target language sentences, the key word class groups corresponding to the patterns and the co-occurrence relation between the key word class groups are associated is previously created, key words are extracted from the input sentence, the extracted keywords are classed based on the classified vocabulary table 12, the expression pattern having the key word class group most similar to the classed key word group is selected from the example DB 11, and the classed key words are returned to the original key words and output, so that the conversion rules and the sentence generation rules can be made compact like in the first embodiment and expression conversion can be performed with simple processing.

Moreover, even when a sentence that is erroneous in a part other than the key words is input, the input sentence can be converted into an expression of which meaning can correctly be understood, so that the conventional problem that an expression conversion result in which an erroneous part remains is output can be solved.

Further, by the word classing, a correct translation result can be output for a new input sentence not included in the sentence examples, so that an interpreting apparatus can be realized that is capable of handling a multiplicity of input sentences with a small example database.

In this embodiment, before interpretation is performed, the contents of key words and the correspondence between key word groups and target language expression patterns are decided and written into the bilingual key word dictionary 16 and the example DB 11, the pair of key words that are in a co-occurrence relation in the dependency structure relation is also added to the expression pattern pair, and then, the word classing means 13 replaces the key words in the example DB 11, the pair of key words that are in a co-occurrence relation and the key words included in the conversion rules with meaning codes based on the meaning codes in the classified vocabulary table 12 to thereby class the keywords. However, the present invention is not limited thereto, and the following maybe performed: First, before interpretation is performed, for each sentence in the tagged corpus 1, the key words in the sentence are replaced with meaning codes by use of the classified vocabulary table 12, from among a predetermined number of combinations of meaning codes among the meaning codes, a combination of meaning codes that are in a co-occurrence relation is identified, and the identified meaning code combination and the expression into which the sentence from which the meaning codes are selected is converted are previously associated.

(Third Embodiment)

Next, a third embodiment will be described. Like the first and the second embodiments, the third embodiment will be described with an interpreting apparatus as an example.

Figure 6:
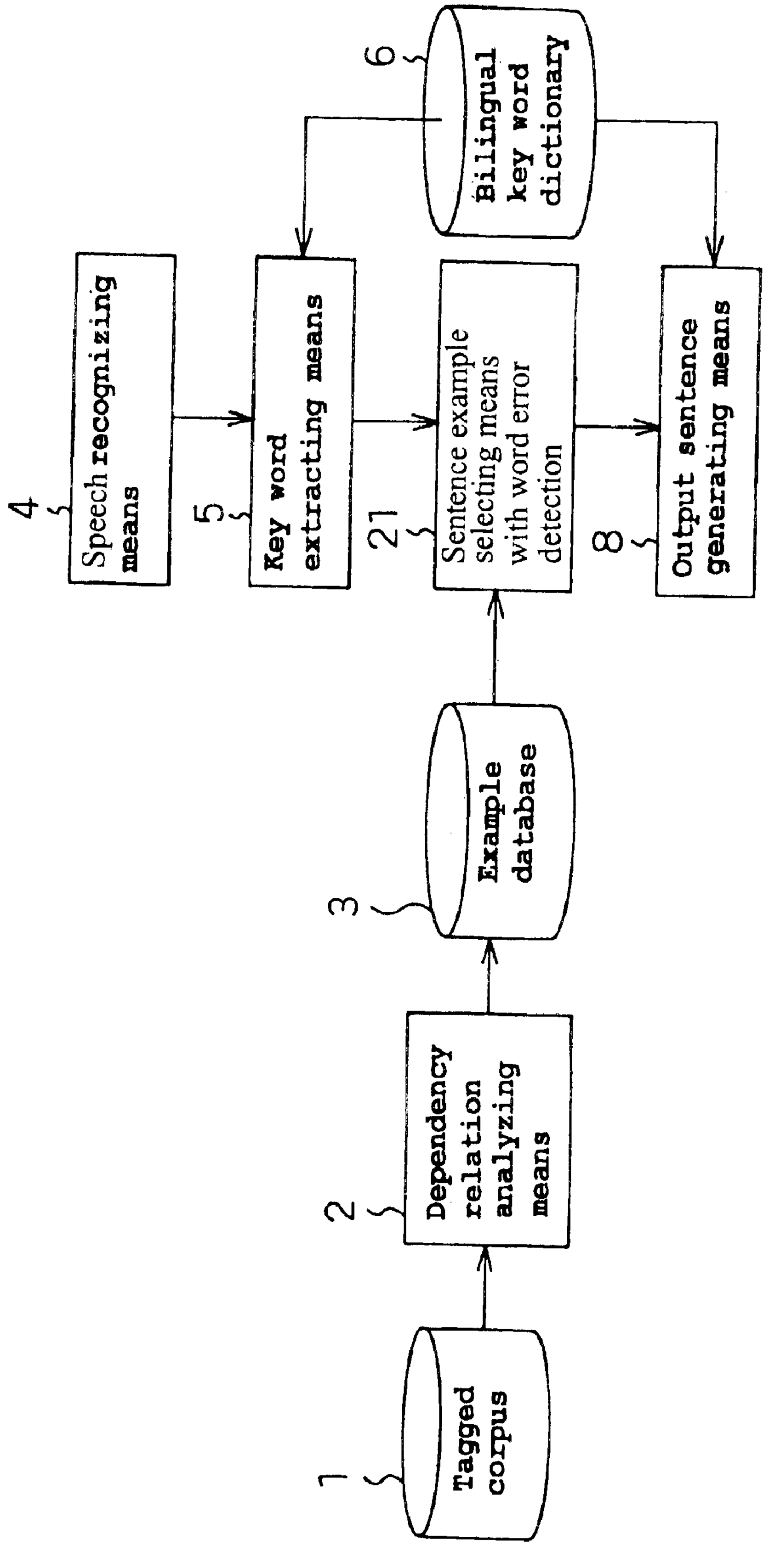
FIG. 6 is a view showing an interpreting apparatus of a third embodiment of the present invention.

FIG. 6 shows the structure of the interpreting apparatus of this embodiment.

Sentence example selecting means 21, in addition to performing the function of the sentence example selecting means 7 of the first embodiment, compares the key word pairs in the example DB 3 and the extracted key word groups, and selects a sentence example on the presumption that, of the extracted key words, a key word that forms a key word pair, based on a co-occurrence relation, with none of the other key words is an erroneously recognized word.

Except this, the structure is the same as that of the first embodiment.

Next, an operation of this embodiment structured as described above will be described.

In the interpreting apparatus of this embodiment, like in the first embodiment, before interpretation is performed, the contents of key words and the correspondence between key word groups and target language expression patterns are decided and written into the bilingual key word dictionary 6 and the example DB 3, and the co-occurrence relation between key words are also added to the example DB 3.

Next, an operation to perform interpretation will be described.

In performing interpretation, first, an original language voice is input to the speech recognizing means 4, and the voice-recognizing means 4 voice-recognizes the original language voice, and outputs a word string candidate which is the result of the recognition.

The key word extracting means 5 receives the result of the recognition output from the speech recognizing means 4, and extracts predetermined key words from the recognition result sentence.

Then, the sentence example selecting means 21 compares the key word pairs in the example DB 3 and the extracted key word pairs, and presumes, of the extracted key words, a key word that forms a key word pair, based on a co-occurrence relation, with none of the other key words to be an erroneously recognized word.

Then, by use of the key words other than the keyword presumed to be erroneously recognized, the sentence example selecting means 21 selects a sentence example of which intention is most similar to that of the input sentence, and outputs the selected sentence example like in the first embodiment.

FIG. 7 shows an example in which although "atsui miruku (熱いミルク)" is input to the voice recognizing means 4, the voice recognizing means 4 erroneously recognizes it as "aoi miruku (熱いミルク)," that is, although a voice "Atsui miruku ha arimasuka (熱いミルクはありますか)" is input to the voice recognizing means 4, the voice recognizing means 4 erroneously recognizes it, and outputs a recognition result sentence "Aoi miruku ha arimasuka (青いミルクはありますか)."

Moreover, in the example of the example DB 3 of FIG. 7, a key word group of "kohi (コーヒー)" and "onegai (お願い)" constitutes a key word pair "(kohi (コーヒー)→onegai (お願い))," and a target language expression pattern "Coffee please" corresponds thereto. Moreover, a key word group of "atui (熱い)," "miruku (ミルク)" and "ari (あり)" includes key word pairs "(atui (熱い)→miruku (ミルク))" and "(miruku (ミルク)→ari (あり))," and a target language expression pattern "Do you have a hot milk?" corresponds thereto.

When the speech recognizing means 4 erroneously recognizes the input voice as described above, the key word extracting means 5 receives a recognition result sentence "Aoi miruku ha arimasuka (青いミルクはありますか)," and extracts three key words "aoi (z,30 )," "miruku (ミルク)" and "(あり)" as the key words.

In such a case, the sentence example selecting means 21 combines the three key words "aoi (青い)," "miruku (ミルク)" and "ari (あり)" extracted by the key word extracting means 5 to create three key word pairs "(aoi (青い)→miruku (ミルク))," "(aoi (青い)→ari (あり))" and "(miruku (ミルク)→ari (あり))," and compares them with the key word groups in the example DB 3.

That is, first, the key word pair "(kohi (コーヒー)→onegai (お願い))" in the first sentence example written in the example DB 3 and the three key word pairs created by combining the three key words are compared. As a result of the comparison, a key word pair that coincides with the key word pair "(kohi (コーヒー)→onegai (お願い))" in the first sentence example is absent.

Then, the key word pairs "(熱い)→miruku (ミルク))" and "(miruku (ミルク)→ari (あり))" in the second sentence example written in the example DB 3 and the three key word pairs created by combining the three key words are compared. As a result of the comparison, of the key word pairs created by combining the three key words, "(miruku (ミルク)→ari (あり))" coincides with a key word pair in the second sentence although "(aoi (青いミルク)→miruku (ミルク))" and "(aoi (青い)→ari (あり))" coincide with none of the key word pairs in the second sentence example.

That is, the key word pairs in the second sentence example in the example DB has a higher degree of similarity to the key word pairs created by combining the three key words than the key word pair in the first sentence example. Therefore, the second sentence example is selected.

Further, the second sentence example is output after the part of the target language expression corresponding to the following key word is removed from the second sentence example: the key word included in the one of the key word pairs in the second sentence that coincides with none of the key word pairs created by combining the three key words which key word is not included in the one of the key word pairs that coincides with the key word pair created by combining the three key words. That is, since "atsui (熱い)" is such a key word, referring to the bilingual key word dictionary 6, the part of the target language expression corresponding to "atsui (熱い)," that is, "hot" is removed from "Any hot milk?," and a sentence "Any milk?" is output.

Thus, when the three key word pairs "(aoi (青い)→miruku (ミルク))," "(aoi (青い)→ari (あり))" and "(miruku (ミルク)→ari (あり))" and the co-occurrence relations, that is, the key word pairs in the example DB 3 are compared, since a word that is in a co-occurrence relation with "atsui (熱い)" is absent in the recognition result, it is presumed that "atsui (熱い)" is erroneously recognized, and a sentence "Any milk?" is output as mentioned above.

While a case where only one sentence example is selected by the sentence example selecting means 21 is described in this embodiment, when more than one sentence examples have an equal degree of similarity as a result of comparing the extracted key word pairs with the key word pairs in the sentence examples of the example DB 3, the more than one sentence examples are output.

The function of the sentence example selecting means 21 in this embodiment is not limited to the above-described one, and may be divided into two steps of erroneous recognition selecting means and sentence selecting means. In this case, erroneously recognized word presuming means presumes an erroneously recognized word by comparing the key word group extracted from the recognition result and the key word pairs written in the example DB 3, and the sentence example selecting means has a similar function to the sentence selecting means 7 of the first embodiment.

In this case, in performing interpretation, the erroneously recognized word presuming means 21 compares the created key word pairs with the key word pairs in each sentence example of the example DB 3, and presumes, of the extracted key words, a key word that forms a key word pair, based on a co-occurrence relation, with none of the other key words to be an erroneously recognized word. Then, by use of the key words other than the key word presumed by the erroneously recognized word presuming means to be erroneously recognized, the sentence example selecting means selects a sentence example of which intention is most similar to that of the input sentence, and outputs the selected sentence example like in the first embodiment. By doing this, even when an erroneously recognized part is included in the result of the recognition by the voice recognizing means 4 as mentioned above and the voice recognizing means 4 outputs a recognition result, "Any milk?" can be output like in the previously-described case by the recognition result being processed by the erroneously recognized word presuming means and the sentence example selecting means.

It is explained in first to third embodiments above that an original language sentence is a Japanese sentence and a target language sentence is an English sentence, or that the interpreting apparatus converts a Japanese sentence into an English sentence, but an original language sentence and a target language sentence may be other language sentences.

The difference from above embodiments will be main ly described below in case of an interpreting apparatus converting an English sentence into a Japanese sentence and in case of an interpreting apparatus converting a Chinese sentence into a Japanese sentence respectively.

First, in the case of an interpereting apparatus converting an English sentence into a Japanese sentence, FIG. 2, FIG. 5, and FIG. 7 are replaced by FIG. 10, FIG. 11 FIG. 12 respectively.

That is, FIG. 10(*a*) is an example of a Bilingual key word dictionary 6 and an example database 3 in this case. FIG. 10(*b*) is an example of the tagged corpus 1 in this case.

FIG. 11(*a*) is an example of a classified vocabulary table 12 in this case. FIG. 11(*b*) is an example of an example database 11.

FIG. 12 is an example of an example database 3 in this case.

It is clear that the each above-mentioned embodiment can be applied to the case where an interpreting apparatus converts an English sentence into a Japanese sentence.

Second, in the case of a interpereting apparatus converting a Chinese sentence into a Japanese sentence, FIG. 2, FIG. 5, and FIG. 7 are replaced by FIG. 13, FIG. 14 FIG. 15 respectively.

That is, FIG. 13(*a*) is an example of a Bilingual key word dictionary 6 and an example database 3 in this case. FIG. 13(*b*) is an example of the tagged corpus 1 in this case.

FIG. 14(*a*) is an example of a classified vocabulary table 12 in this case. FIG. 11(*b*) is an example of an example database 11.

FIG. 15 is an example of an example database 3 in this case.

It is clear that the each above-mentioned embodiment can be applied to the case where an interpreting apparatus converts a Chinese sentence into a Japanese sentence.

While the dependency relation analyzing means 2 pairs key words that are in a co-occurrence relation in this embodiment, the present invention is not limited thereto; the dependency relation analyzing means 2 may pair key words that are in a dependency relation.

The tagged corpus 1 of this embodiment is an example of the corpus of the present invention. The key word pairs of this embodiment are examples of the key word combinations of the present invention. The dependency relation analyzing means 2 of this embodiment is an example of the associating means of the present invention. The key word extracting means 5 and the sentence example selecting means 7 of this embodiment are examples of the converting means of the present invention. The classified vocabulary table 12 of this embodiment is an example of the classing information of the present invention. The dependency relation analyzing means 2 and the word classing means 13 of this embodiment are examples of the associating means of the present invention. The key word extracting means 5 and the sentence example selecting means 14 of this embodiment are examples of the converting means of the present invention. The key word extracting means 5 and the sentence example selecting means 21 of this embodiment are examples of the converting means of the present invention. The meaning code of this embodiment is a example of the class name of the present invention.

Further, the predetermined number of the present invention is not limited to two which is the predetermined number in this embodiment, and it may be one. In this case, instead of combining key words into key word pairs and comparing the key word pairs, the key words are independently compared. Moreover, the predetermined number may be three. In this case, combinations of three key words are used for the comparison. Moreover, the predetermined number may be two and three. In this case, both key word pairs and combinations of three key words are used for the comparison. To sum up, it is necessary for the predetermined number of the present invention only to be a given positive integer or a plurality of different given positive integers.

Further, the expression converting apparatus of the present invention is not limited to the interpreting apparatus of this embodiment; it is necessary for the expression converting apparatus of the present invention only to be an apparatus that converts an input sentence into a different expression such as: a translating apparatus that converts an input text into a text in a different language and outputs the converted text, for example, converts an input Japanese text into an English text and outputs the English text; a sentence pattern converting apparatus that converts written language into spoken language; and a summary creating apparatus that summarizes a complicated or redundant sentence and outputs a summary.

Further, the expression converting method of the present invention is not limited to the interpreting method of this embodiment; it is necessary for the expression converting method of the present invention only to be a method of converting an input sentence into a different expression such as: translation to convert an input text into a text in a different language and output the converted text, for example, convert an input Japanese text into an English text and output the English text; sentence pattern conversion to convert written language into spoken language; and summary creation to summarize a complicated or redundant sentence and output a summary.

By previously creating the example database in which standard or simplified expression patterns of output target language sentences are associated with the key word groups corresponding to the patterns and the co-occurrence relation between the key word groups, extracting key words from the input sentence, selecting from the example database the expression pattern including the key word group most similar to the extracted key word group, and outputting the selected expression pattern as described above, the conversion rules and the sentence generation rules can be made compact, so that expression conversion can be performed with simple processing.

Moreover, even when a sentence that is erroneous in a part other than the key words is input, the input sentence can be converted into an expression of which meaning can correctly be understood, so that the conventional problem that an expression conversion result in which an erroneous part remains is output can be solved.

Further, even when a key word is erroneous, according to the degree of the error, it is possible to convert the input sentence into an expression of which meaning can correctly be understood or to notify the user that the meaning cannot be understood, so that the conventional problem that an expression conversion result in which an erroneous part remains is output can be solved.

Further, the present invention is a program for causing a computer to perform the functions of all or some of the means (or apparatuses, devices, circuits, portions or the like) of the above-described expression converting apparatus of the present invention which program operates in cooperation with the computer.

Further, the present invention is a program for causing a computer to perform the operations of all or some of the steps (or processes, operations, actions or the like) of the above-described expression converting method of the present invention which program operates in cooperation with the computer.

Some of the means (or apparatuses, devices, circuits, portions or the like) of the present invention and some of the steps (or processes, operations, actions or the like) of the present invention mean some means of the plural means and some steps of the plural steps, respectively, or mean some functions of one means and some operations of one step, respectively.

Moreover, a computer-readable record medium on which the program of the present invention is recorded is also included in the present invention.

Moreover, a usage pattern of the program of the present invention may be such that the program is recorded on a computer-readable record medium and operates in cooperation with the computer.

Moreover, a usage pattern of the program of the present invention may be such that the program is transmitted through a transmission medium to be read by a computer and operates in cooperation with the computer.

The record medium includes ROMs. The transmission medium includes a transmission medium such as the Internet, and light, radio waves and sound waves.

As described above, the structure of the present invention may be realized either as software or as hardware.

As detailed above, according to this embodiment, by extracting key words from the input sentence, converting the input sentence into a standard or simplified expression sentence representative of the same meaning by use of the extracted key words, and outputting the expression sentence, the conversion rules and the sentence generation rules can be made compact, so that expression conversion can be performed with simple processing. Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, by extracting, as key words, words which are some of the content words included in the input sentence or the words into which the words which are some of the content words are converted, and generating a standard or simplified expression sentence comprising a combination of the key words and the expression decided by the sentence meaning presumed from the input sentence, the conversion rules and the sentence generation rules can be made compact, so that expression conversion can be performed with simple processing.

Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, by extracting key words from the input sentence, presuming the sentence meaning from the co-occurrence dependency relation or the co-occurrence relation between the extracted key words, and generating a standard or simplified expression from a combination of only words predetermined from the key words or the equivalents of the key words and the presumed intention, the conversion rules and the sentence generation rules can be made compact, so that expression conversion can be performed with simple processing.

Moreover, even when a sentence that is erroneous in a part other than the key words is input, the input sentence can be converted into an expression of which meaning can correctly be understood, so that the conventional problem that an expression conversion result in which an erroneous part remains is output can be solved.

Moreover, by previously creating the example DB in which output standard or simplified expression patterns, the key word groups corresponding to the patterns and the dependency relation or the co-occurrence relation between key word groups are associated, extracting a key word group from the input sentence, selecting from the example DB an expression pattern including the key word group most similar to the extracted key word group, and outputting the selected sentence example, in addition to the above-mentioned effects, expression conversion can accurately be performed faithfully to the kind, the domain and the sentence pattern of the actually input sentence.

Moreover, by the expression patterns written in the example DB each consisting of only key words or equivalents of the key words, the effects can be enhanced.

Moreover, by the description of the expression patterns written in the example DB, the key word groups and the dependency relation between the key word groups or the key words that are in a co-occurrence relation being a description of classes of words including the key words, in addition to the above-mentioned effects, even when a key word not included in the example DB is input, an appropriate sentence example can be selected, so that expression conversion capable of handling a wider variety of input sentences is enabled.

Moreover, by extracting a key word group from the input sentence, presuming an input error word from the relation between the extracted key words, presuming the sentence meaning from the key words other than the key word presumed to be an input error word, and generating a standard or simplified expression from a word combination decided by the presumed sentence meaning, in addition to the above-mentioned effects, even when a key word is erroneous, according to the degree of seriousness of the error, it is possible to convert the input sentence into an expression of which meaning can correctly be understood or to notify the user that the meaning cannot be understood, so that the conventional problem that an expression conversion result in which an erroneous part remains is output can be solved.

The present invention can provide an expression converting method, an expression converting apparatus and a program being compact in structure and capable of high-speed processing.

Moreover, the present invention can provide an expression converting method, an expression converting apparatus and a program capable of, even when a part other than the key words of the input sentence is erroneously recognized because of a voice recognition error or the like, outputting a result that correctly conveys the intention without the quality of the output sentence adversely affected.

Moreover, the present invention can provide an expression converting method, an expression converting apparatus and a program capable of, even when a part of the input sentence is erroneously recognized because of a voice recognition error or the like, avoiding the conventional problem that a result not conveying the sentence meaning at all is output.

What is claimed is:

1. An expression converting method wherein by use of classing information in which key words are previously classed based on predetermined properties and each class Is provided with a name, for each sentence in a corpus, key words are selected from the sentence, a combination of classes that are in a co-occurrence relation are identified from among a predetermined number of combinations of classes among classes to which the selected key words belong, and the Identified class combination and an expression into which the sentence from which the key words are selected is converted are previously associated, and wherein predetermined key words are selected from an input sentence, classes to which the selected key words belong are combined, the class combinations and the previously identified class combination of each sentence are compared, one or more than one sentences that coincide or have a high degree of similarity as a result of the comparison are selected, and expressions into which the selected sentences are converted are output, and the predetermined key words of each sentence in the corpus are stored, from the stored predetermined key words of each sentence in the corpus, predetermined class combinations of key words are selected as having a dependency relationship and stored, and the predetermined class combinations of key words are Individually selected for each sentence from the stored predetermined key words of the sentence.

2. An expression converting method wherein for each sentence In a corpus, key words are selected from the sentence, a combination of key words that are in a co-occurrence relation is identified from among a predetermined number of combinations of key words among the selected key words, and the identified key word combination and an expression into which the sentence from which the key words are selected is converted are previously associated, wherein by use of classing information in which key words are previously classed based on predetermined properties and each class is provided with a name, the identified key word combination is associated with a class combination to thereby identify a class combination of the sentence, and wherein predetermined key words are selected from an input sentence, classes to which the selected key words belong are combined, the class combinations and the previously identified class combination of each sentence are compared, one or more than one sentences that coincide or have a high degree of similarity as a result of the comparison are selected, and expressions into which the selected sentences are converted are output, and the predetermined key words of each sentence in the corpus are stored, from the stored predetermined key words of each sentence in the corpus, predetermined combinations of key words are selected as having a dependency relationship and stored, and the predetermined combinations of key words are individually selected for each sentence from the stored predetermined key words of the sentence.

3. An expression converting apparatus comprising:

associating means of, by use of classing information in which key words are previously classed based on predetermined properties and each class is provided with a name, for each sentence in a corpus, selecting key words from the sentence, identifying a combination of classes that are in a co-occurrence relation from among a predetermined number of combinations of classes among classes to which the selected key words belong, and previously associating the identified class combination and an expression into which the sentence from which the key words are selected is converted; and converting means of selecting predetermined key words from an input sentence, combining classes to which the selected key words belong, comparing the class combinations and the previously Identified class combination of each sentence, selecting one or more than one sentences that coincide or have a high degree of similarity as a result of the comparison, and outputting expressions into which the selected sentences are converted, wherein the predetermined key words of each sentence in the corpus are stored, from the stored predetermined key words of each sentence in the corpus, predetermined class combinations of key words are selected as having a dependency relationship and stored, and the predetermined class combinations of key words are individually selected for each sentence from the stored predetermined key words of the sentence.

4. An expression converting apparatus comprising:

associating means of, for each sentence in a corpus, selecting key words from the sentence, identifying a combination of key words that are in a co-occurrence relation from among a predetermined number of combinations of key words among the selected key words, and previously associating the Identified key word combination and an expression into which the sentence from which the key words are selected is converted, and by use of classing information in which key words are previously classed based on predetermined properties and each class is provided with a name, associating the identified key word combination with a class combination to thereby identify a class combination of the sentence; and converting means of selecting predetermined key words from an input sentence, combining classes to which the selected key words belong, comparing the class combinations and the previously identified class combination of each sentence, selecting one or more than one sentences that coincide or have a high degree of similarity as a result of the comparison, and outputting expressions into which the selected sentences are converted, and the predetermined key words of each sentence in the corpus are stored, from the stored predetermined key words of each sentence in the corpus, predetermined combinations of key words are selected as having a dependency relationship and stored, and the predetermined combinations of key words are individually selected for each sentence from the stored predetermined key words of the sentence.

5. An expression converting apparatus according to claim 3 or 4, wherein when the degree of similarity is high as the result of the comparison, said converting means outputs the selected expression after removing a part of the selected expression into which a class is converted, said class belonging to the previously Identified class combination of the selected sentence that does not coincide with the combined class combination and not being included in the previously identified class combination of the selected sentence that coincide with the combined class combination.

6. An expression converting apparatus according to claim 3 or 4, wherein said expression into which the sentence is converted comprises only class.

7. A program for causing a computer to function all or part of the expression converting apparatus of claim 3.

8. A program for causing a computer to function as all or part of the expression converting apparatus of claim 4.

* * * * *

UNITED STATES PATENT AND TRADEMARK OFFICE

CERTIFICATE OF CORRECTION

PATENT NO. : 6,862,566 B2 
DATED : March 1, 2005
INVENTOR(S) : Wakita et al.

It is certified that error appears in the above-identified patent and that said Letters Patent is hereby corrected as shown below:

Title page,
Item [56], References Cited, FOREIGN PATENT DOCUMENTS,
"JP 8-278974" should read
-- JP 8-278794 --.
OTHER PUBLICATIONS,
"N. Hataoka" reference, "Labratory" should read -- Laboratory --.

Column 22,
Line 22, "IS" should read -- is --.
Line 25, "are identified" should read -- is identified --.
Line 47, "Individually" should read -- individually --.
Line 50, "In" should read -- in --.

Column 23,
Line 32, "Identified" should read -- identified --.

Column 24,
Lines 4 and 37, "Identified" should read -- identified --.
Line 45, after "function" insert -- as --.

Signed and Sealed this

Eighteenth Day of October, 2005

JON W. DUDAS
*Director of the United States Patent and Trademark Office*